No. 648,912. Patented May 8, 1900.
A. BECK.
BICYCLE LOCK.
(Application filed July 5, 1899.)

(No Model.)

Witnesses.

Inventor.
August Beck,
By James L. Norris,
Atty

UNITED STATES PATENT OFFICE.

AUGUST BECK, OF BERLIN, GERMANY.

BICYCLE-LOCK.

SPECIFICATION forming part of Letters Patent No. 648,912, dated May 8, 1900.

Application filed July 5, 1899. Serial No. 722,850. (No model.)

*To all whom it may concern:*

Be it known that I, AUGUST BECK, a subject of the King of Prussia, Emperor of Germany, residing at Berlin, in the Kingdom of Prussia, Germany, have invented certain new and useful Improvements in Locks for Cycles, (for which I have applied for patents in England, No. 11,836, dated June 7, 1899; in France, No. 277,536, dated June 5, 1899; in Belgium, No. 112,398, dated June 5, 1899; in Austria, dated June 13, 1899; in Hungary, No. 8,428, dated June 5, 1899, and in Germany dated, March 1, 1899,) of which the following is a specification.

Owing to the fact that velocipedes are so often stolen many means have been devised and tried with the view of preventing such thefts, such means generally consisting in devices for locking a rotating and fixed part of the wheel together. Such of these locking devices as have come into popular use are more or less objectionable, however, by reason of the fact that they are readily accessible to and may be tampered with by an unauthorized person.

The object of this invention is to provide a cycle-lock the parts of which shall be protected by their position against being tampered with and can only be actuated by the use of a key of a given shape.

The annexed drawings show by way of example one mode of carrying out the invention.

Figure 1:
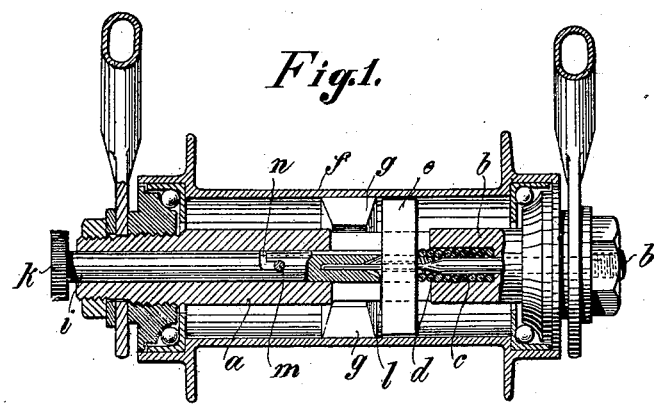
Figure 3:
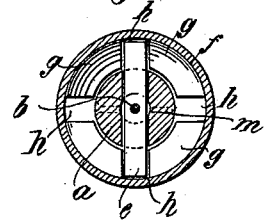
Figure 2:
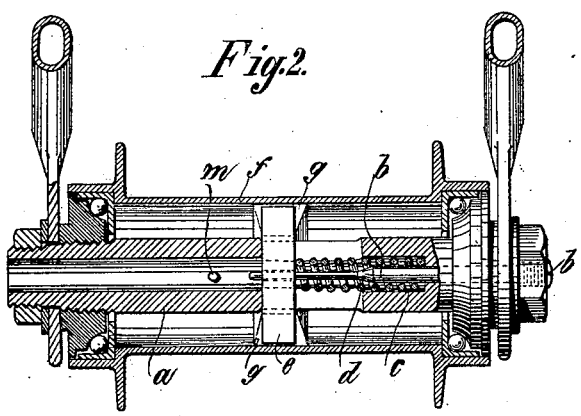
Figure 4:
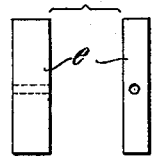
Figure 5:
Figure 6:

On the drawings, Figure 1 is a longitudinal section through the hub and axle of a machine and showing the theft-prevention device and its key within the hub and in the unlocked position. Fig. 2 is a similar view showing the theft-prevention device in the locked position. Fig. 3 is a cross-section of Fig. 1. Fig. 4 is a view of the locking-plate. Fig. 5 is a view of the key. Fig. 6 shows a pin which is screwed into the axle for the central guidance of the locking-plate and which is opposite to the key when inserted.

Into the hollow axle $a$ of the wheel, on one side, a pin $b$ is screwed, whose tapered end extends a little beyond the center of the axle. At the center of the axle $a$ is a vertical slot in which works the locking-plate $e$, which is always guided to the center by means of the pin $b$. The hollow $c$ of the axle $a$ is on the side of the pin $b$ made in such manner that one end of the spiral spring $d$, coiled around the pin, can bear solidly against it, while the other end of said spring can press against the plate $e$. At the middle of the hub $f$, at the inside, there is rigidly secured to it a round disk $g$, arranged diametrically across the hub and which has four openings $h$, arranged at right angles to one another and corresponding in width to the thickness of the locking-plate. The key $i$, Fig. 1, which is introduced into the hollow axle $a$, has at its outer end an appropriate knob $k$ and at its inner end a hole $l$, which is destined to receive the tapered end of the pin $b$. This hole $l$ is of such a depth that the key $i$ when inserted can push the plate $e$ by a single pressure out of its position, and thereby compress the spring $d$. This spring $d$ when so compressed continually tends to force the plate $e$ back into the spaces $h$ of the disk $g$. On this ground a stable pressure must be opposed to the action of the spring in order that it may be impossible for the locking apparatus to catch when the machine is being ridden. For this reason the key $i$ is made with a bayonet-groove $n$, into which a pin $m$, fixed at the inner side of the hollow axle, can enter. Said pin after the plate $e$ is forced back enters, owing to the action of the spring $d$, at a single turn of the key $i$, into the short end of the groove $n$.

The *modus operandi* is as follows: When the wheel is to be locked, a slight pressure on the knob $k$ of the key $i$ and a turn of the latter are sufficient to enable the key to be taken out of the axle $a$. The plate $e$ will then on account of this action and the action of the spring $d$ (the hub $f$ and the disk $g$, which is arranged in the hub, being in an appropriate position) freely enter one of the cross-spaces $h$ of the disk. The bringing of the hub and disk $g$ to the proper position is effected by turning the wheel slowly forward or backward. When the wheel is to be set free again, the key $i$ is inserted in the hollow axle $a$, the plate $e$ is forced back, and a turn is given to the key, as a result of which the pin $m$ enters the groove $n$. The parts are retained in this position by the action of the spring $d$. The key $i$ remains in the axle $a$ while the machine is running, thereby retaining, on the one hand, the locking apparatus out of gear and, on the other hand, protecting it against external influences.

If so desired, each wheel of the bicycle can be locked independently.

It is evident that the shape and number of grooves $n$ and corresponding pins and the position of the entire mechanism relatively with the hub can be varied.

The fundamental idea of the invention—to connect at the inside of the hub of the wheel in such a manner as to prevent the wheel revolving the rotating and non-rotating parts, so that only a key of a certain shape inserted from the outside into the hollow axle can be used for unlocking the mechanism—is naturally not confined to the special construction hereinbefore described.

What I claim, and desire to secure by Letters Patent of the United States, is—

1. A cycle-lock comprising, in combination with a fixed axle and a hub revolving thereon, means located within the hub for normally locking said hub and axle in fixed relation, and means adapted to be inserted and retained within the hub for unlocking the locked parts and holding them in an unlocked position, substantially as described.

2. A cycle-lock comprising, in combination with a fixed axle having a longitudinal bore and a hub revolving on said axle, a locking member carried by said hub, a locking member slidably mounted in the axle, a spring tending normally to hold said locking members in a locked position, and means adapted to be inserted and retained in said bore for unlocking said locking members and holding them in an unlocked position, substantially as described.

3. A cycle-lock comprising in combination with a fixed axle having a longitudinal bore and a hub revolving on said axle, a locking member carried by said hub, a locking member slidably mounted in the axle, a spring seated in said bore and bearing on said sliding member and tending normally to hold it in engagement with the locking member of the hub, a key adapted to be inserted in the bore of the axle and to engage the sliding locking member to move it out of engagement with the other locking member, and means for locking said key in such inserted position, substantially as described.

4. A cycle-lock comprising in combination with a fixed axle having a longitudinal bore and a hub revolving on said axle, a disk carried by said hub and encircling said axle and having a series of radial recesses, a locking-plate slidably mounted in the axle, a spring seated in said bore and bearing on said locking-plate to hold it normally in engagement with the recesses of the disk, a key adapted to be inserted in said bore to engage the locking-plate and move it out of engagement with the recesses of said disk, and means for locking the key in such inserted position, substantially as described.

5. A cycle-lock comprising in combination with a fixed axle having a longitudinal bore and a transverse slot, and a hub revolving on said axle, a disk carried by said hub and encircling said axle and having a series of radial recesses, a locking-plate slidably mounted in said slot, a pin secured in one end of the axle and extending through said locking-plate to center it, a spring seated in said bore and bearing on said locking-plate to hold it normally in engagement with the recesses of the disk, a key adapted to be inserted in said bore to engage the locking-plate and move it out of engagement with the recesses of said disk, said key being provided with a bayonet-slot, and a lug in said bore for engagement with said bayonet-slot, whereby when the key has been inserted to unlock the parts it may be turned and locked in such inserted position, substantially as described.

In testimony whereof I have hereunto set my hand in the presence of two witnesses.

AUGUST BECK.

Witnesses:
HENRY HASPER,
WOLDEMAR HAUPT.